United States Patent
Liao (10) Patent No.: US 9,973,877 B2
(45) Date of Patent: May 15, 2018

(54) METHOD OF HANDLING SMALL DATA TRANSMISSION

(71) Applicant: HTC Corporation, Taoyuan County (TW)

(72) Inventor: Ching-Yu Liao, Taoyuan County (TW)

(73) Assignee: HTC Corporation, Taoyuan (TW)

( * ) Notice: Subject to any disclaimer, the term of this patent is extended or adjusted under 35 U.S.C. 154(b) by 732 days.

(21) Appl. No.: 13/624,980

(22) Filed: Sep. 24, 2012

(65) Prior Publication Data
US 2013/0080597 A1 Mar. 28, 2013

Related U.S. Application Data

(60) Provisional application No. 61/538,155, filed on Sep. 23, 2011.

(51) Int. Cl.
G06F 15/16 (2006.01)
H04W 4/00 (2018.01)
H04L 5/00 (2006.01)

(52) U.S. Cl.
CPC ............ *H04W 4/005* (2013.01); *H04L 5/0001* (2013.01)

(58) Field of Classification Search
CPC .............................. H04W 4/005; H04L 5/0001
USPC ................ 709/202–203, 217–219, 227–229; 370/400–401, 229–231
See application file for complete search history.

(56) References Cited

U.S. PATENT DOCUMENTS

| | | | | |
|---|---|---|---|---|
| 9,247,471 B2* | 1/2016 | Velev | ..................... | H04W 4/005 |
| 9,271,316 B2* | 2/2016 | Bakker | ............... | H04W 76/021 |
| 9,398,555 B2* | 7/2016 | Watfa | ..................... | H04W 60/04 |
| 2012/0250601 A1* | 10/2012 | Choi | ..................... | H04W 88/04 370/329 |
| 2012/0254890 A1* | 10/2012 | Li | ......................... | H04W 4/005 719/313 |
| 2012/0322440 A1* | 12/2012 | Jeong | .................... | H04W 4/005 455/425 |
| 2013/0083765 A1* | 4/2013 | Ai | ................................. | 370/329 |
| 2014/0233538 A1* | 8/2014 | Zhang et al. | ................ | 370/336 |
| 2017/0064530 A1* | 3/2017 | Chin | ...................... | H04W 4/22 |

OTHER PUBLICATIONS

GPP TR 23.888 V1.4.0 (Aug. 2011) Technical Report 3rdGeneration Partnership Project; Technical Specification Group Services and System Aspects; System Improvements for Machine-Type Communications; (Release 11).
"Small Data Transmission via NAS Signalling", SA WG2 Meeting #85;S2-112574;May 16-20, 2011, Xi'An, P.R. China.
"Online Small Data Transfer using NAS", SA WG2 Meeting #86;S2-113043;Jul. 11-15, 2011, Naantali, Finland.

* cited by examiner

*Primary Examiner* — Bharat N Barot
(74) *Attorney, Agent, or Firm* — Winston Hsu (57) ABSTRACT

A method of handling small data transmission for a core network is disclosed, wherein the core network comprises a data base, a network gateway node and a network control node. The method comprises the network gateway node receiving a service request message from a machine-type communication (MTC) server, wherein information of the service request message is eligible for the small data transmission between a mobile device and the network gateway node; and the network gateway node including a small data transmission indicator in the service request message, wherein the small data transmission indicator indicates the small data transmission.

11 Claims, 7 Drawing Sheets

METHOD OF HANDLING SMALL DATA TRANSMISSION

CROSS REFERENCE TO RELATED APPLICATIONS

This application claims the benefit of U.S. Provisional Application No. 61/538,155 filed on Sep. 23, 2011 and entitled "Method of triggering small data transmission for detached UE via MTC-IWF", the contents of which are incorporated herein.

BACKGROUND OF THE INVENTION

1. Field of the Invention

The present invention relates to a method utilized in a mobile communication environment, and more particularly, to a method of handling small data transmission in a mobile communication environment.

2. Description of the Prior Art

Machine-type communication (MTC) is one type of data communication including one or more entities not requiring human interactions. That is, the MTC refers to the concept of communication based on a network such as the existing GERAN, UMTS, long-term evolution (LTE), or the like used by a machine device instead of a mobile station (MS) used by a user. The machine device used in the MTC can be called an MTC device. There are various MTC devices such as a vending machine, a machine of measuring a water level at a dam, etc. That is, the MTC is widely applicable in various fields. The MTC device has features different from that of a typical MS. Therefore, a service optimized to the MTC may differ from a service optimized to human-to-human communication. In comparison with a current mobile network communication service, the MTC can be characterized as a different market scenario, data communication, less costs and efforts, a potentially great number of MSs for communication, wide service areas, low traffic per MS, etc.

Meanwhile, the number of MTC devices is expected to be much greater than the number of legacy devices, and a probability of performing operations of the plurality of MTC devices simultaneously is high due to a feature of a typical machine-to-machine (M2M) service. M2M communication (also referred to as "machine-type communications" or "MTC") may be used in a variety of areas. In the area of security, M2M communication may be used in surveillance systems, in backup of telephone landlines, in the control of physical accesses (e.g. to buildings), and in car/driver security. In the area of tracking and tracing, M2M communication may be used for fleet management, order management, Pay As You Drive (PAYD) applications, asset tracking, navigation, traffic information applications, road tolling, traffic optimization, and steering. In the area of payment systems, M2M communication may be used in point of sales, vending machines, customer loyalty applications, and gaming machines. In healthcare, M2M communication may be used for remotely monitoring vital signs, supporting the elderly or handicapped, in web access telemedicine points, and in remote diagnostics. In the area of remote maintenance/control, M2M communication may be used in programmable logic controllers (PLCs), sensors, lighting, pumps, valves, elevator control, vending machine control, and vehicle diagnostics. In the area of metering, M2M communication may be used in applications related to power, gas, water, heating, grid control, and industrial metering. Additionally, M2M communication based on machine type communication (MTC) technology may be used in areas such as customer service.

M2M communications may take advantage of deployed wireless networks based on Third Generation Partnership Project (3GPP) technologies such as Global System for Mobile Communications (GSM), Universal Mobile Telecommunications System (UMTS), Long Term Evolution (LTE), Long Term Evolution Advanced (LTE-Advanced), and/or other technologies such as WiMAX (Worldwide Interoperability for Microwave Access) or those developed by the Institute for Institute of Electrical and Electronics Engineers (IEEE) and 3GPP2. M2M communications may use networks based on these technologies to deliver business solutions in a cost-effective manner. In a circumstance involving ubiquitous deployment of wireless networks, the availability of the wireless networks may facilitate and/or encourage the deployment and use of M2M devices. Additionally, further enhancements to these technologies may provide additional opportunities for the deployment of M2M-based solutions.

A Device Trigger Delivery Gateway (DT-GW) could be a standalone physical entity or a functional entity. At least one Device Trigger Delivery Gateway is owned by and deployed in a HPLMN that supports the MTC device trigger feature for subscribed devices. The DT-GW is deployed on the boundary between the HPLMN and the public Internet. Alternatively, the DT-GW is owned and operated by a 3rd party on behalf of the HPLMN and/or deployed in the public Internet. In which case, a secure tunnelling mechanism between the DT-GW and the HPLMN is utilized.

The MTC server sends a trigger request message to the appropriate DT-GW encapsulated in an IP packet. The trigger request message could contain pertinent information needed to route the trigger (e.g. device subscriber identity, trigger command/arguments, relevant device location information, security parameters, etc.). When a trigger request message is received from a submitting node (e.g. an authorized MTC server or IWF function on behalf of the MTC server), the DT-GW should first authorize the received trigger request message; making sure it originated from a trusted MTC server and is targeted for a device for which the MTC server is authorized to trigger. The next step is for the DT-GW to determine the reachability of the MTC device. Per the requirements specified in clause 5.8 of 3GPP documentation TS 22.368 b.1.1, a trigger-able MTC device can be received in the detached state, in the attached state without a publically routable PDP context/PDN connection and in the attached state with a publically routable PDP context/PDN connection.

When the MTC server sends trigger request message for the target MTC device to the network, e.g. HSS/HLR or DT-GW/MTC-IWF, the network may not be able to process the trigger request due to network congestion. However due to lacking of network congestion information, it is still not clear how the network, e.g. HSS/HLR or DT-GW, suppresses the received trigger request or incoming trigger requests when network is congested.

MTC Devices with Small Data Transmission send or receive only small amounts of data. The exact amount that is considered to be small may differ per individual system improvement proposal. It is the amount of data where a specific system improvement proposal still provides its benefits. For online small data transmission, it is assumed that data transfer can happen any time when needed by the application. Before the transmission of the small data, the MTC device may be attached to or detached from the network. When the MTC Device is in offline state, it wishes to send one packet of small data to network and doesn't need any further communication with the MTC Server for quite a long time, the MTC Device can encapsulate the small data packet in application layer protocol format into the NAS Attach message, and the network can forward the data.

However, there are ambiguities which are not specified clearly in the prior art.

(1) In the prior art, the trigger request is sent to the UE transparently to trigger a detached UE. However it is not clear how the network, e.g. MME or MTC-IWF, determines to adopt small data transmission for a trigger request that, sending from the MTC server, is eligible for small data transmission between the network and the UE.

(2) To support the small data transmission, the network needs to be able to recognize the small data payload in the signaling message as well as corresponding handling for the signaling messages. Therefore, the network needs to support the small data capability. However it is not clear how the network informs the UE about the network capabilities for small data transmission.

(3) In prior art, the solution is only for MT or MO single one IP packet delivery, including one pair of request and response, via NAS signaling. When the one pair transmission is done for MO small data transmission, the MME uses knowledge of the subscriber to determine whether to proceed with the full UE triggered Service Request procedure, or, to immediately release the RRC connection, or to wait for some time (e.g. to see if a downlink IP packet causes the S-GW to send a Downlink Data notification to the MME for MT small data transmission). However if this procedure is used to transfer more than one (pair) of IP packets, the network or the UE does not know when the small data transmission is finished. Also for bi-directional small data transmission, the network or the UE does not have information how to proceed with the small data transmission if small data transmission is finished in the uplink but not in the downlink and vice versa.

(4) In prior art, the small data transmission is transmitted via NAS signaling for an attached UE which entails an existing PDP context/PDN connection. When the detached UE receives trigger request and it needs only MO small data transmission, the UE can send attach request with the small data transmission indicator and include small data payload in the EPS session management (ESM) message container. However, if a UE used for MTC needs only small data transmission by sending/receiving small data to/from the MTC server via NAS signaling in the control plane, it is not necessary to stick to the always-on principle by the user plane handling for the establishment of a default EPS bearer and keeping a PDP context/PDN connection.

SUMMARY OF THE INVENTION

It is therefore a primary objective of the present invention to provide method of handling small data transmission in a mobile communication environment.

A method of handling small data transmission for a core network is disclosed, wherein the core network comprises a data base, a network gateway node and a network control node. The method comprises the network gateway node receiving a trigger request message from a machine-type communication (MTC) server, wherein information of the trigger request message is eligible for the small data transmission between a mobile device and the network gateway node; and the network gateway node including a small data transmission indicator in the trigger request message, wherein the small data transmission indicator indicates the small data transmission.

A method of handling small data transmission for a core network is disclosed, wherein the core network comprises a data base, a network gateway node and a network control node. The method comprises the network gateway node receiving a trigger request message from a machine-type communication (MTC) server, wherein information of the trigger request message is eligible for the small data transmission between a mobile device and the network node; and the network gateway node including a small data transmission indicator in the trigger request message, wherein the small data transmission indicator indicates the small data transmission.

A method of handling small data transmission for a network control node is disclosed. The method comprises the network control node indicating support of small data transmission capability by sending system information to a mobile device in a broadcast channel, wherein the system information indicates to the mobile device that the network control node supports capability of the small data transmission.

A method of handling small data transmission for a transmission node is disclosed. The method comprises the transmission node applying the small data transmission by sending small data payload which comprises at least one IP packet or at least one data packet via a non-access stratum (NAS) signaling message, wherein the at least one IP packet or the at least one data packet comprises mobile terminating (MT) IP packet or data packet, or mobile originating (MO) IP packet or data packet.

A method of handling small data transmission for a mobile device is disclosed. The method comprises the mobile device not including a PDN connectivity request in an Embedded Syslog Manager (ESM) message container when the mobile device sends an attach request with a small data payload via the ESM message container or a information element (IE) according to reception of the trigger request.

A method of handling small data transmission for a network node is disclosed. The method comprises the network control node receiving a NAS signaling request message with a small data transmission indicator via an ESM message container or an information element (IE), wherein the small data transmission indicator indicates the small data transmission and an ESM message container includes a PDN connectivity request; and the network control node storing the small data indicator for a mobile device and ignoring the ESM message for the PDN connectivity and creating a control plane link to a network gateway node.

These and other objectives of the present invention will no doubt become obvious to those of ordinary skill in the art after reading the following detailed description of the preferred embodiment that is illustrated in the various figures and drawings.

DETAILED DESCRIPTION

The following description is of the best-contemplated mode of carrying out the invention. This description is made for the purpose of illustrating the general principles of the invention and should not be taken in a limiting sense. Note that the 3GPP specifications described herein are used to teach the spirit of the invention, and the invention is not limited thereto.

Figure 1:
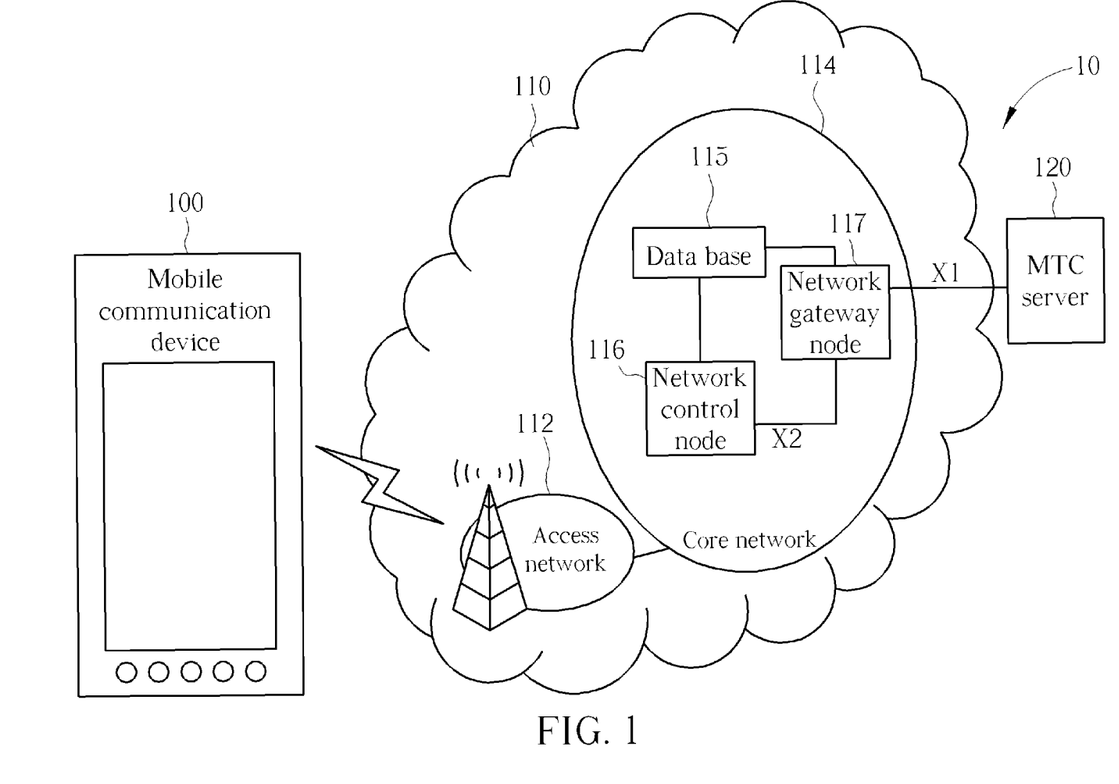
FIG. 1 is a schematic diagram of an exemplary mobile communication environment.

In order to solve the aforementioned problems, the invention provides methods for handling signaling and data transmission for MTC, where the signaling may be trigger related messages but not limited herein and the data transmission may be with small payload which is eligible for delivering via control plane. Please note that the signaling may be for MTC device with particular MTC features, e.g. MTC monitoring, MTC device triggering, etc. FIG. 1 is an exemplary system architecture for MTC (Machine Type Communication) which illustrates a mobile communication environment (or mobile communication system) 10 according to an embodiment of the invention. The mobile communication environment 10 includes at least one mobile communication device 100, a service network 110 and a MTC server 120. In the mobile communication environment 10, the mobile communication device 100, which may be a Mobile Station (MS)/User Equipment (UE), is wirelessly connected to the service network 110 for obtaining wireless services. The service network 110 comprises an access network (or called radio access network) 112 and a core network 114.

In the mobile communication environment 10, the mobile communication device 100 is configured for MTC and runs an application for MTC. The mobile communication device 100 may communicate with the MTC server 120 via the service network 110 which may be a 3GPP network, e.g. Global System for Mobile Communication (GSM) network, Universal Mobile Telecommunications System (UMTS) network, or Evolved Packet System (EPS) network. The MTC server 120 may be a server capable of triggering MTC applications (also called MTC services) on the mobile communication device 100. The MTC server 120 can be further connected to one or more MTC application server via certain Application Programming Interfaces (API) and provides triggering services via the service network 110 for the connected MTC application servers. Specifically, the MTC server 120 can send a trigger request message (or called trigger indication) via the service network 110 to the mobile communication device 100 for executing specific MTC application(s).

The service network 110 may comprise an access network (or called radio access network) 112 and a core network 114, wherein the access network 112 allows connectivity between the mobile communication device 100 and the core network 114 by providing the functionality of wireless transmissions and receptions to and from the mobile communication device 100 for the core network 114, and the core network 114 signals the required operations to the access network 112 for providing wireless services to the mobile communication device 100. The service network 110 may be a network in compliance with the Global System for Mobile Communication (GSM), Universal Mobile Telecommunications System (UMTS), or Evolved Packet System (EPS) technology. The access network 112 may be a GSM Edge Radio Access Network (GERAN) in the GSM technology, a UMTS Terrestrial Radio Access Network (UTRAN) in the WCDMA/HSPA technology, or an Evolved-UTRAN (E-UTRAN) in the LTE/LTE-Advanced technology, and the core network 114 may be a GSM core network, a General Packet Radio Service (GPRS) core network in the GSM/UMTS system, or an Evolved Packet Core (EPC) network in the EPS system.

The core network 114 is connected to the access network 112, which may include a network control node 116 (e.g. SGSN/MME or S-GW or GGSN/PGW), a data base 115 (e.g. HSS/HLR), a PDN gateway node 118 and a network gateway node 117 (e.g. device trigger delivery gateway or MTC-IWF), for providing various services to the mobile communication device 100. Please note that the database 115 can also co-located with the network gateway node 117. For example, the SGSN or MME/Service Gateway (S-GW) is the key network control node for packet routing and transfer, mobility management (e.g., attach/detach and location management), session management, logical link management, authentication and charging functions, and interfaces an E-UTRAN/UTRAN/GERAN for the creation of relevant radio bearers. The S-GW provides the mobile communication device 100 a direct user plane connectivity by being a bridge between the EUTRAN and, the PDN gateway node 118, and it has a control plan interface to the MME for handling mobile terminated calls to reach the mobile communication device 100 in idle mode. The GGSN or PDN gateway node 118 is responsible for inter-working between the UMTS or EPS network and external networks. The HSS or HLR is a central database that contains user-related and subscription-related information. HLR is responsible for enabling subscriber access, which can be considered as a subset of HSS. Functions of HSS/HLR include functionalities such as mobility management, call and session establishment support, user authentication and access authorization. The service-related entity, e.g. MTC server 120, may be inside or outside of the service network 110 and may indirectly connect to network entity, e.g. via network gateway or interworking function after appropriate authorization process, or directly connect to GGSN/PGW if user plane connection is established and remains active. Further, the core network 114 may provide different interfaces to the MTC server 120. The MTC server 120 may transmit a trigger message to the network gateway node 117 with interworking function to process service request, e.g. trigger service, received from the MTC server 120 for further trigger delivery, where the network gateway node 117 is an entry point of the service network 110 to the MTC server 120 and an intermediate network node to interface with SMS-SC (SMS service center) or network control node 116, e.g. MME/SGSN/MSC. Please note that the mobile communication device receives the trigger request message from network control node 116 via NAS signaling connection.

Figure 2:
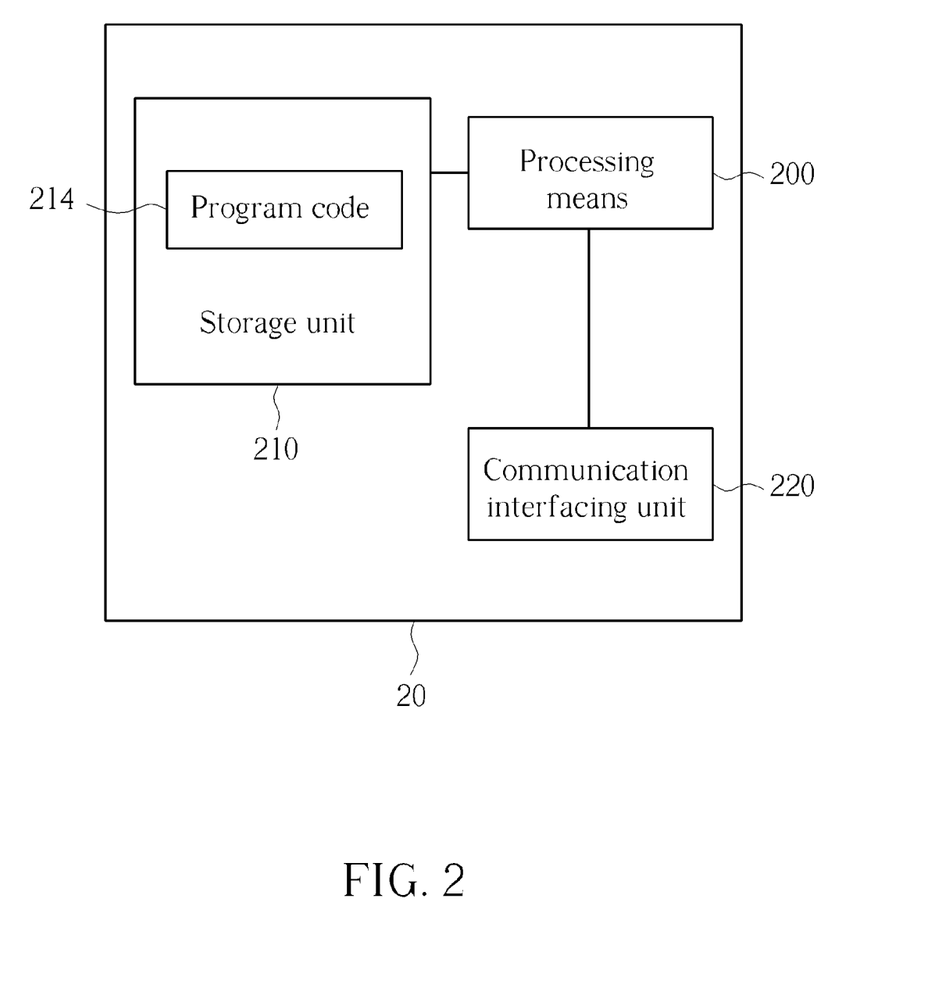
FIG. 2 is a schematic diagram of an exemplary communication device.

FIG. 2 illustrates a schematic diagram of an exemplary communication device 20. The communication device 20 may be implementation of the data base 115, the network control node 116, the network gateway node 117 or the MTC server 120 shown in FIG. 1, but is not limited herein. The communication device 20 may include a processing means 200 such as a microprocessor or Application Specific Integrated Circuit (ASIC), a storage unit 210 and a communication interfacing unit 220. The storage unit 210 may be any data storage device that can store program code 214, for access by the processing means 200. Examples of the storage unit 210 include but are not limited to a subscriber identity module (SIM), read-only memory (ROM), flash memory, random-access memory (RAM), CD-ROMs, magnetic tape, hard disk, and optical data storage device. The communication interfacing unit 220 is preferably a radio transceiver and can exchange wireless signals with the network according to processing results of the processing means 200.

Figure 3:
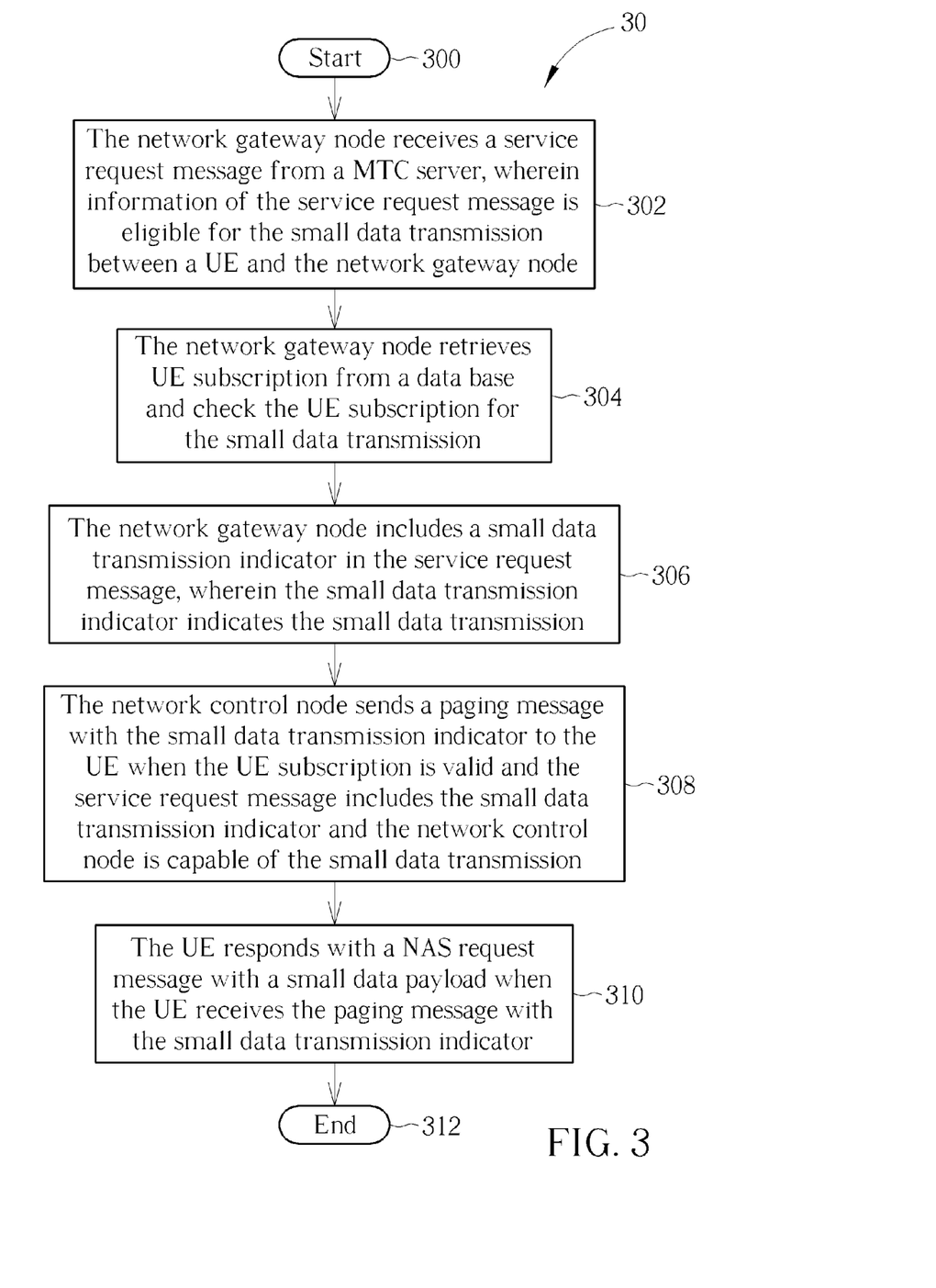
FIGS. 3-8 are flowchart diagrams of exemplary processes.

Please refer to FIG. 3, which is a flow chart of an exemplary process 30. The process is used for small data transmission in a mobile communication environment. The mobile communication environment could be the mobile communication environment 10, including a MTC server, a UE, a network control node (e.g. SGSN/MME or S-GW or GGSN/PGW) and a network gateway node (e.g. S-GW/P-GW/MTC-IWF). The process 30 can be compiled into the program code 214, including the following steps:

Step 300: Start.

Step 302: The network gateway node receives a service request message from a MTC server, wherein information of the service request message is eligible for the small data transmission between the UE and the network gateway node.

Step 304: The network gateway node retrieves UE subscription from a data base and checks the UE subscription for the small data transmission.

Step 306: The network gateway node includes a small data transmission indicator in the service request message, wherein the small data transmission indicator indicates the small data transmission.

Step 308: The network control node sends a paging message with the small data transmission indicator to the UE when the UE subscription is valid and the trigger request message includes the small data transmission indicator and the network control node is capable of the small data transmission.

Step 310: The UE responds with a NAS request message with a small data payload when the UE receives the paging message with the small data transmission indicator.

Step 312: End.

According to the process 30, the network gateway node receives the service request message from the MTC server. If the information of the service request message is eligible for the small data transmission between the UE and the network gateway node, for example, the estimated payload is within the limitation of the small data transmission or the frequency of the transmission is less than a threshold of the small data transmission or the MTC server indicates the support of small data transmission feature, the network gateway node retrieves the UE subscription from the data base (e.g. HSS/HLR) to further check the UE subscription for the small data transmission. If the UE subscription is valid, the network gateway node includes the small data transmission indicator in the trigger request message and sends the trigger request message to the network control node (e.g. SGSN/MME or S-GW or GGSN/PGW). The small data transmission indicator indicates the transmission is for small data transmission. If the network control node is not capable of the small data transmission, the network control node removes the small data transmission indicator from the service request message and sends the service request message without the small data transmission indicator to the UE. If the network control node is capable of the small data transmission and the UE subscription is valid and the service request message includes the small data transmission indicator, all conditions above are met, the network control node sends the paging message with the small data transmission indicator to the UE. When the UE receives the paging message with the small data transmission indicator, the UE responds with a NAS request message (e.g. TAU/RAU request) with a small data payload. The TAU/RAU message can be used for a couple times for the small data transmission which is configured in the UE based on the network policies.

Therefore, according the process 30, based on the UE's subscription and network capability, the MME/SGSN and MTC-IWF can determine to adopt the small data transmission for the service request.

Please note that the service request message sent from the MTC server can be for trigger service, monitoring service, etc., but is not limited to. The service request message can indicate the service type in the service request message. That is, the small data transmission may be utilized with many services types when applicable.

Figure 4:
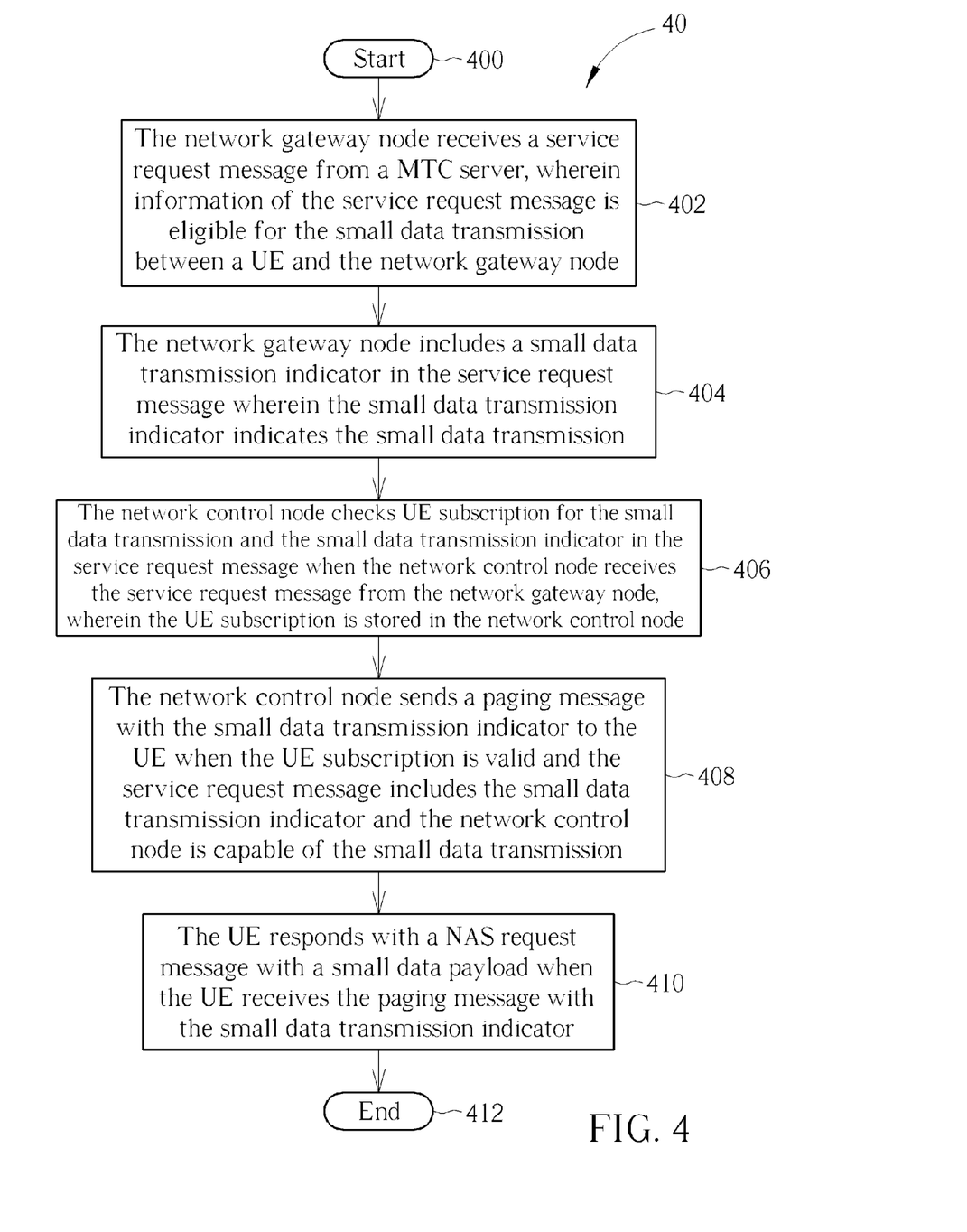

Please refer to FIG. 4, which is a flow chart of an exemplary process 40. The process is used for small data transmission in a mobile communication environment. The mobile communication environment could be the mobile communication environment 10, including a MTC server, a UE, a network control node (e.g. SGSN/MME or S-GW or GGSN/PGW) and a network gateway node (e.g. S-GW/PGW, MTC-IWF). The process 40 can be compiled into the program code 214, including the following steps:

Step 400: Start.

Step 402: The network gateway node receives a service request message from a MTC server, wherein information of the service request message is eligible for the small data transmission between a UE and the network gateway node.

Step 404: The network gateway node includes a small data transmission indicator in the service request message wherein the small data transmission indicator indicates the transmission is for small data transmission.

Step 406: The network control node checks UE subscription for the small data transmission and the small data transmission indicator in the service request message when the network control node receives the service request message from the network gateway node, wherein the UE subscription is stored in the network control node Step 408: The network control node sends a paging message with the small data transmission indicator to the UE when the UE subscription is valid and the service request message includes the small data transmission indicator and the network control node is capable of the small data transmission.

Step 410: The UE responds with a NAS request message with a small data payload when the UE receives the paging message with the small data transmission indicator.

Step 412: End.

According to the process 40, the network gateway node receives the service request message from the MTC server. If the information of the service request message is eligible for the small data transmission between the UE and the network gateway node, for example, the estimated payload is within the limitation of the small data transmission or the frequency of the transmission is less than a threshold of the small data transmission or the MTC server indicates the support of small data transmission feature, the network gateway node includes the small data transmission indicator in the service request message and sends the service request message to the network control node (e.g. SGSN/MME or S-GW or GGSN/PGW). The small data transmission indicator indicates that the small data transmission is applied. The network control node checks UE subscription for the small data transmission and the small data transmission indicator in the service request message when the network control node receives the service request message from the network gateway node and it has capability for small data transmission, where the UE subscription is stored in the network control node during attach or tracking/routing/location area update procedures. If the UE subscription is not valid or the network control node is not capable of the small data transmission, the network control node removes the small data transmission indicator from the trigger request message and sends the service request message without the small data indicator to the UE. The network control node responds to the service request message received from the network gateway node with the result for the activation of the small data transmission in a response message. If the network control node is capable of the small data transmission and the UE subscription is valid and the service request message includes the small data transmission indicator, all conditions above are met, the network control node sends the paging message with the small data transmission indicator to the UE. When the UE receives the paging message with the small data transmission indicator, the UE responds with a NAS request message (e.g. TAU/RAU request) with a small data payload. The TAU/RAU message can be used for a couple times for the small data transmission which is configured in the UE based on the network policies.

Therefore, according the process 40, based on the UE's subscription and network capability, the MME/SGSN and MTC-IWF can determine to adopt the small data transmission for the service request.

Please note that the service request message sent from the MTC server can be for trigger service, monitoring service, etc., but is not limited to. The service request message can indicate the service type in the service request message. That is, the small data transmission may be utilized with many services types when applicable.

Figure 5:
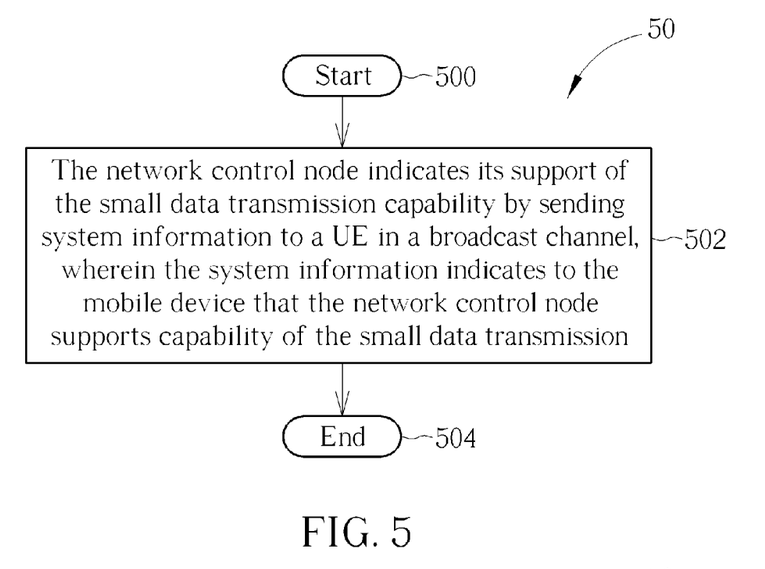

Please refer to FIG. 5, which is a flow chart of an exemplary process 50. The process is used for handling small data transmission for a network control node. The network control node could be the network control node 116 (e.g. SGSN/MME or S-GW or GGSN/PGW). The process 50 can be compiled into the program code 214, including the following steps:

Step 500: Start.

Step 502: The network control node indicates its support of the small data transmission capability by sending system information to a UE in a broadcast channel, wherein the system information indicates to the mobile device that the network control node supports capability of the small data transmission.

Step 504: End.

According to the process 50, the network control node sends system information to the UE and informs the UE of the network capability for the small data transmission. The system information is sent in the broadcast channel. By receiving the system information, the UE can know that the network control node supports the small data transmission. Further, the network control nodes can indicate its capability of the small data transmission in attach accept message or tracking/routing/location area update accept message, e.g. in core network feature IE.

Figure 6:
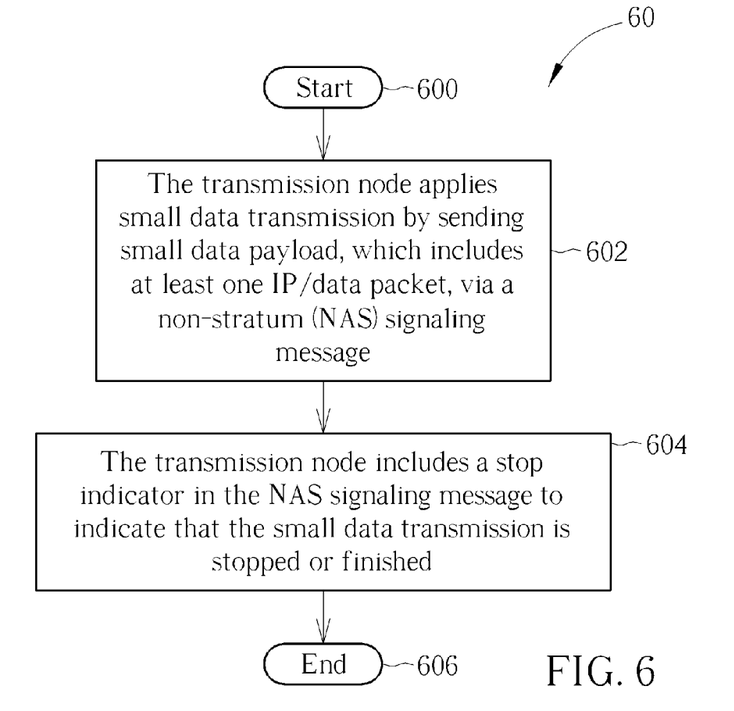

Please refer to FIG. 6, which is a flow chart of an exemplary process 60. The process is used for handling small data transmission for a transmission node. The transmission node could be a UE, a network control node (e.g. SGSN/MME) or a network gateway node (e.g. MTC-IWF). The process 60 can be compiled into the program code 214, including the following steps:

Step 600: Start.

Step 602: The transmission node applies small data transmission by sending small data payload, which includes at least one IP/data packet, via a non-access stratum (NAS) signaling message.

Step 604: The transmission node includes a stop indicator in the NAS signaling message to indicate that the small data transmission is stopped or finished.

Step 606: End.

According to the process 60, the transmission node sends small data payload in a small data container IE via the NAS signaling message (e.g. uplink generic NAS transport message, downlink generic NAS transport message, attach request/accept message, TAU/RAU/LAU request/accept message, service request message, etc.).

For example, the small data payload may contain at least one IP/data packet which may be mobile originated (MO) IP/data packet or mobile terminated (MT) IP/data packet. At least one small data container may be included in the NAS signaling message to piggyback the IP/data packets for end-to-end transmission with the same source and destination addresses. If only one small data container is provided, the header of the small data container may indicate related information, e.g. the length of the IP/data packets for end-to-end transmission with a specific source and destination addresses. Please note that the small data payload can piggyback IP packets which are associated to a bearer in a specific PDN connection, or data packets which may be associated to a source and destination identifier, e.g. MTC/application server and UE's identify. In later case, the UE may not have a PDN connection for user plane end-to-end transmission. Compared to the prior art, the transmission nodes send more than one MT IP/data packets or MO IP/data packets via the NAS message. When the transmission node (e.g. the UE or the MME/SGSN) transmits the last small data payload, the transmission node includes the stop indicator for the small data transmission in the NAS signaling message if it determines to stop applying small data transmission. The stop indicator indicates that the small data transmission is stopped or finished at the transmission node. Further, if the transmission node is the network control node, e.g. MME/SGSN, the stop indicator may be received from the network gateway node, e.g. MTC-IWF or P-GW/S-GW, in the GTP-U or GTP-C message along with the last small data payload, where the stop indicator is to indicate the network control node that no more IP/data packets for small data transmission. The network control node determines if continuing to apply the small data transmission based on stop indicator received from the UE and/or network gateway node, pending downlink data, and operator policies, etc.

When the transmission node (e.g. MME/SGSN or UE) makes sure that the small data transmission for both links (uplink and downlink) are finished, a receiving node releases the RRC connection. For example, the MME can release the RRC connection when the MME receives the stop indicator for ending MO small data transmission in the NAS signaling from the UE and the MME does not have pending IP/data packets for small data transmission to the UE. For another example, if there exists only MT small data transmission, when the UE receives the stop indicator in the NAS signaling message with the last small data payload, the UE can release RRC connection directly or indicate the stop indicator to the MME for releasing the RRC connection if the UE does not have pending uplink data for small data transmission.

In order to avoid the abuse of the small data transmission, if the transmission node needs more data for transmission, the transmission node re-establishes the RRC connection with establishment cause as MT-data or MO-data, and then transmits using an existing PDN connection (for QoS provisioning, UE may need to perform related UE requested ESM procedures, e.g. UE requested bearer resource allocation/modification procedure) or sends PDN connectivity request message to create a new PDN connection if needed.

In the example of the present disclosure such that small data (e.g. IP packets or data packet with small payload size) transmission via a NAS signaling message (e.g. UPLINK and/or DOWNLINK GENERIC NAS TRANSPORT) is used, multiple NAS signaling messages can be transmitted in a RRC connection for small data transmission. That is, when applying small data transmission, the network and/or UE can piggyback small data in multiple NAS signaling messages in an established RRC connection.

In some examples, a NAS protocol data unit (PDU) contains IP packets for the small data transmission and EPS bearer ID. The EPS bearer ID is used to indicate the associated PDN connection for the small data transmission and is included in a new information element (IE) or in a generic message container of the uplink and/or downlink generic NAS transport message which may have a new generic message container type indicating the small data or type of the small data. That is, there can be only one generic message container type for applications applying small data transmission. Or, there are different types of small data transmission and each is with a new generic message container type associated to different applications. Alternatively, a NAS protocol data unit (PDU) contains data packets for the small data transmission since there is no PDN connection established. The generic message container may only contain the data packets for the small data transmission and a control link identifier which is handled and allocated by the network control node.

In other examples, the generic message container may only contain the IP packets for the small data transmission. The EPS bearer ID is indicated in an additional information IE or a new IE. In other words, the small data and the EPS bearer ID are placed separately.

Figure 7:
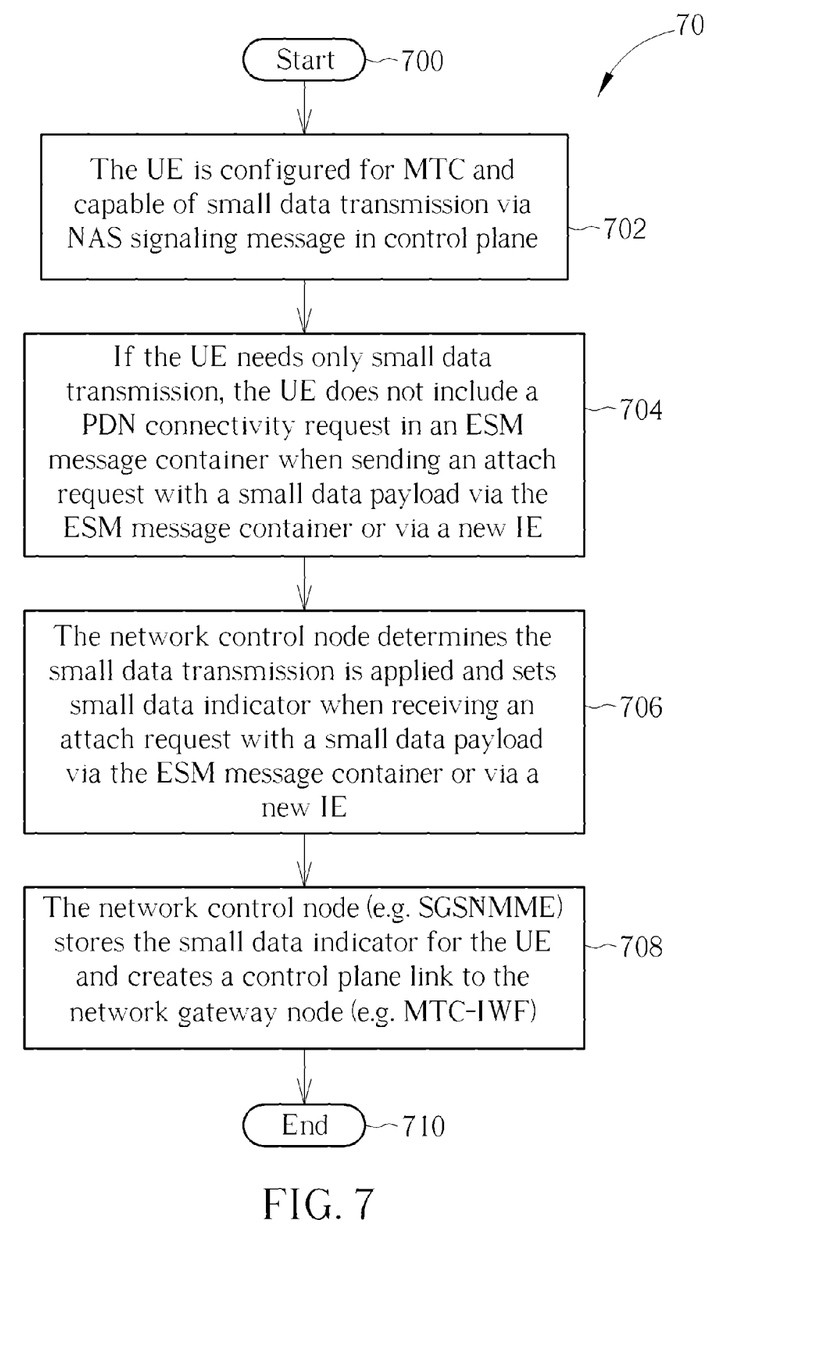

Please refer to FIG. 7, which is a flow chart of an exemplary process 70. The process is used for a UE for handling small data transmission in a mobile communication environment. The UE could be the mobile communication device 100 in the mobile communication environment 10. The process 70 can be compiled into the program code 214, including the following steps:

Step 700: Start.

Step 702: The UE is configured for MTC and capable of small data transmission via NAS signaling message in control plane.

Step 704: If the UE needs only small data transmission, the UE does not include a PDN connectivity request in an ESM message container when sending an attach request with a small data payload via the ESM message container or via a new IE.

Step 706: The network control node determines the small data transmission is applied and sets small data indicator when receiving an attach request with a small data payload via the ESM message container or via a new IE.

Step 708: The network control node (e.g. MME) stores the small data indicator for the UE and creates a control plane link to the network gateway node (e.g. MTC-IWF).

Step 710: End.

According to the process 70, when the UE configured for MTC and capable of small data transmission needs only small data transmission, the UE sends the attach requests with the small data payload via ESM message container without including the PDN connectivity request in the ESM message container. The UE fills the small data payload in the ESM message container contents and indicates the size of the small data payload in the length of ESM message container contents. If the UE sends small data payload in the attach request, it may also include a small data transmission indicator in the ESM message container or in a new IE.

Therefore, when the UE used for MTC needs only small data transmission by sending/receiving small data to/from the MTC server via NAS signaling in the control plane, the process 70 can avoid the establishment of a default EPS bearer and the PDP context/PDN connection.

For example, the UE in detach mode may perform attach procedure only for small data transmission if the small data transmission is configured with a pre-schedule time in the UE or if the UE receives a trigger message with small data transmission indicator to initiate small data transmission. For another example, the UE may be in idle mode and may be paged with small data transmission indicator. In this case, the UE may determine to reattach to the network only for small data transmission.

Please note that the above invention can also be applied for other network control node, e.g. SGSN, MSC. The skilled person can refer to this invention for possible extension.

Figure 8:
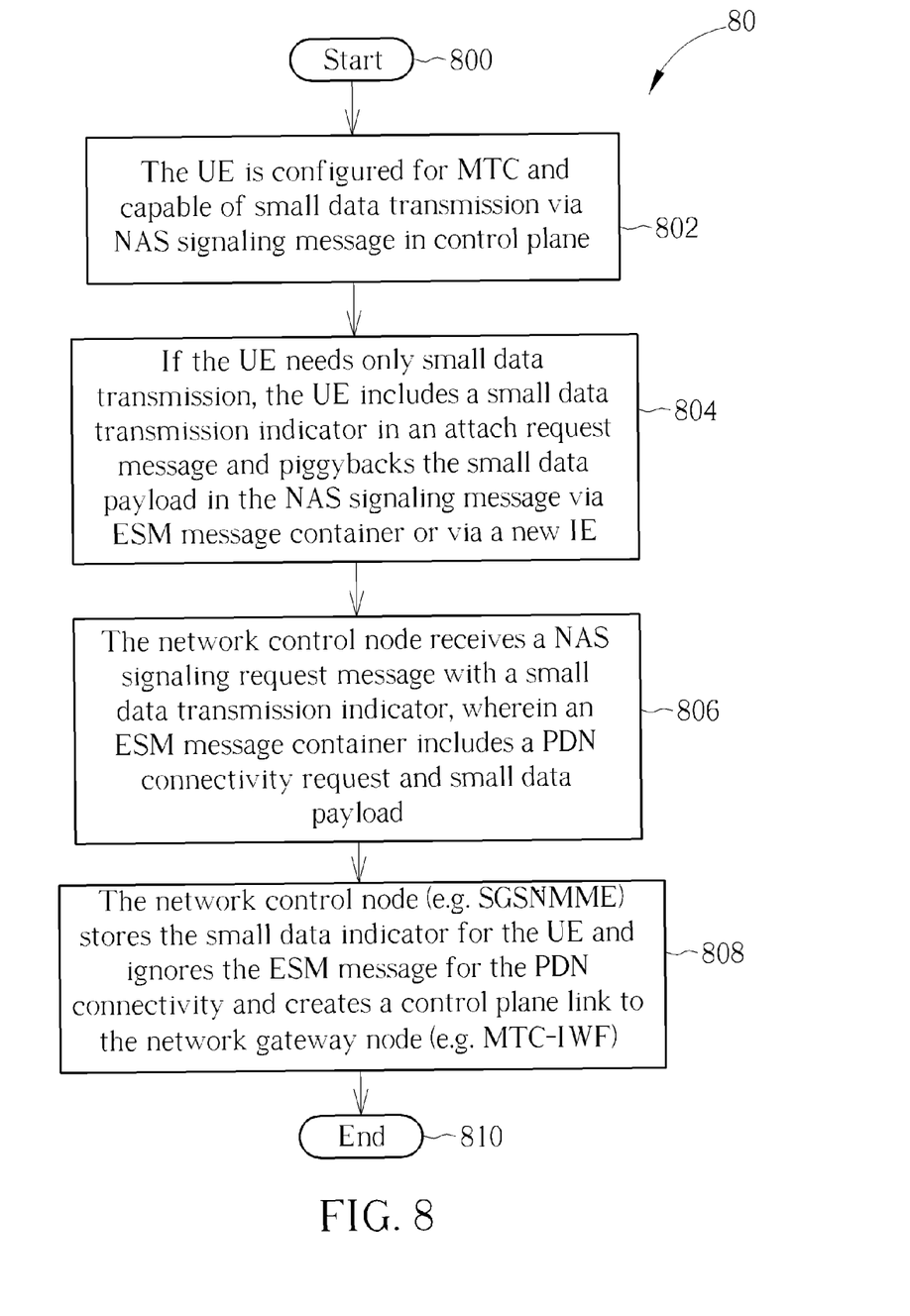

Please refer to FIG. 8, which is a flow chart of an exemplary process 80. The process is used for a network control node for handling small data transmission in a mobile communication environment. The network control node could be the network control node 116 (e.g. MME) in the mobile communication environment 10. The process 80 can be compiled into the program code 214, including the following steps:

Step 800: Start.

Step 802: The UE is configured for MTC and capable of small data transmission via NAS signaling message in control plane.

Step 804: If the UE needs only small data transmission, the UE includes a small data transmission indicator in an attach request message and piggybacks the small data payload in the NAS signaling message via ESM message container or via a new IE.

Step 806: The network control node receives a NAS signaling request message with a small data transmission indicator, wherein an ESM message container includes a PDN connectivity request and small data payload.

Step 808: The network control node (e.g. MME) stores the small data indicator for the UE and ignores the ESM message for the PDN connectivity and creates a control plane link to the network gateway node (e.g. MTC-IWF).

Step 810: End.

According to the process 80, when the UE configured for MTC and capable of small data transmission needs only small data transmission, the UE includes a small data transmission indicator in an attach request message and piggybacks the small data payload in the NAS signaling message via ESM message container or via a new IE. The network control node receives a NAS signaling request message with a small data transmission indicator, wherein an ESM message container includes a PDN connectivity request and small data payload when the network control node (e.g. MME) receives a NAS signaling request message with a small data transmission indicator, wherein an ESM message container includes a PDN connectivity request and small data payload, the network control node stores the small data indicator for the UE and ignores the ESM message for the PDN connectivity and creates a control plane link to the network gateway node (e.g. MTC-IWF). The network control node does not send create session request to the S-GW and does not send activation of default EPS bearer request to the UE.

Instead, the network control node creates a control plane link between the network control node (e.g. MME) and a network gateway node (e.g. MTC-IWF) for the UE. The control plane protocol in the control plane link may be GPRS tunneling protocol (GTP), e.g. GTP-C tunnel, GTP-U tunnel, diameter protocol, or a new protocol over Sx interface between the MME and the MTC-IWF, named as Sx-AP which is S1-AP like protocol. It is noted that S1-AP protocol, where S1 is the interface and AP represents application part, is the 3GPP term for signaling protocol between two nodes and relies on a reliable transport mechanism running on top of SCTP. Afterwards, the network control node and the network gateway node encapsulate the small data payload in the control plane message over the interface between the network control node and the network gateway node.

Whenever the network control node or network gateway node appends small data payload for transmission in a signaling message over Sx interface, the network control node/network gateway node includes a small data indicator in a signaling message over Sx interface. A receiving node determines whether the small data exists according to the small data transmission indicator.

Please note that the above invention can also be applied for other network control node, e.g. SGSN, MSC. The skilled person can refer to this invention for possible extension.

Furthermore, the aforementioned steps of the processes including suggested steps can be realized by means that could be a hardware, a firmware known as a combination of a hardware device and computer instructions and data that reside as read-only software on the hardware device, or an electronic system. Examples of hardware can include analog, digital and mixed circuits known as microcircuit, microchip, or silicon chip. Examples of the electronic system can include a system on chip (SOC), system in package (SiP), a computer on module (COM), and the communication device 20.

To sum up, a MTC-IWF includes a small data transmission indicator in a trigger request message if the information of the trigger request message from the MTC server is eligible for the small data transmission. If the UE subscription is valid and the trigger request message includes the small data transmission indicator and a MME is capable of the small data transmission, the MME sends the paging message with the small data transmission indicator to a UE. When the UE receives the paging message with the small data transmission indicator, the UE responds with a NAS request message with a small data payload.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of handling small data transmission for a mobile device, the method comprising:
the mobile device creating a PDN connection for the small data transmission; and
the mobile device sending a non-access stratum (NAS) signaling message to a network on an established RRC connection, wherein the NAS signaling message includes a small data container which includes at least one Internet Protocol (IP) packet and the NAS signaling message includes a header of the small data container which indicates length of the at least one IP packet, and wherein the NAS signaling message includes an Evolved Packet System (EPS) bearer ID used for indicating an associated PDN connection for the small data transmission.

2. The method of claim 1, wherein the NAS signaling message is an uplink generic NAS transport message, an attach request message, a TAU/RAU/LAU request message, or a service request message.

3. The method of claim 1 further comprising including a stop indicator in the NAS signaling message to indicate that the small data transmission is stopped or finished.

4. The method of claim 1, wherein the network is a mobility management entity (MME) or a serving GPRS support node (SGSN).

5. The method of claim 1 further comprising receiving support of small data transmission from the network.

6. A method of handling small data transmission for a network, the method comprising:
the network creating a PDN connection for the small data transmission; and
the network sending a non-access stratum (NAS) signaling message to a mobile device on an established RRC connection, wherein the NAS signaling message includes a small data container which comprises at least one Internet Protocol (IP) packet and the NAS signaling message includes a header of the small data container which indicates length of the at least one IP packet, and wherein the NAS signaling message includes an Evolved Packet System (EPS) bearer ID used for indicating an associated PDN connection for the small data transmission.

7. The method of claim 6, wherein the NAS signaling message is a downlink generic NAS transport message, an attach accept message or a TAU/RAU/LAU accept message.

8. The method of claim 6, wherein the network is a mobility management entity (MME) or a serving GPRS support node (SGSN).

9. The method of claim 6 further comprising transmitting support of small data transmission to the mobile device.

10. The method of claim 6, wherein the NAS signaling message is an uplink generic NAS transport message, an attach request message, a TAU/RAU/LAU request message or a service request message.

11. The method of claim 6, further comprising releasing an RRC connection when the network receives a stop indicator for ending the small data transmission in the NAS signaling message and does not have pending data for the small data transmission to transmit to the mobile device.

* * * * *